United States Patent [19]

Ziegler et al.

[11] Patent Number: 4,730,650
[45] Date of Patent: Mar. 15, 1988

[54] DEVICE FOR DETERMINING THE FLUID LEVEL IN A CONTAINER AND CONTAINER HAVING SUCH A DEVICE

[75] Inventors: Klaus Ziegler, Furtwangen; Reiner Liebl, Schwalbach, both of Fed. Rep. of Germany

[73] Assignee: VDO Adolf Schindling AG, Frankfurt am Main, Fed. Rep. of Germany

[21] Appl. No.: 926,374

[22] Filed: Oct. 31, 1986

[30] Foreign Application Priority Data

Oct. 31, 1985 [DE] Fed. Rep. of Germany ....... 3538741

[51] Int. Cl.⁴ ................................................ B65B 3/04
[52] U.S. Cl. ....................................... 141/95; 141/98; 137/392; 340/614

[58] Field of Search ..................................... 141/1-12, 141/94, 95, 96, 98, 198, 65, 66; 340/614; 33/558; 137/392; 73/298, 299, 300

[56] References Cited

U.S. PATENT DOCUMENTS 4,417,232 11/1983 Tewfik ................................ 340/614

Primary Examiner—Houston S. Bell, Jr.
Attorney, Agent, or Firm—Martin A. Farber

[57] ABSTRACT

In a device for detecting filling level of liquid in a container, a protective tube (6) extends over a membrane (5) which can be placed in vibration by an electromechanical transducer (4). In this way, bubbles which rise in the liquid cannot reach the membrane and induce a false measurement of low filling level.

8 Claims, 3 Drawing Figures

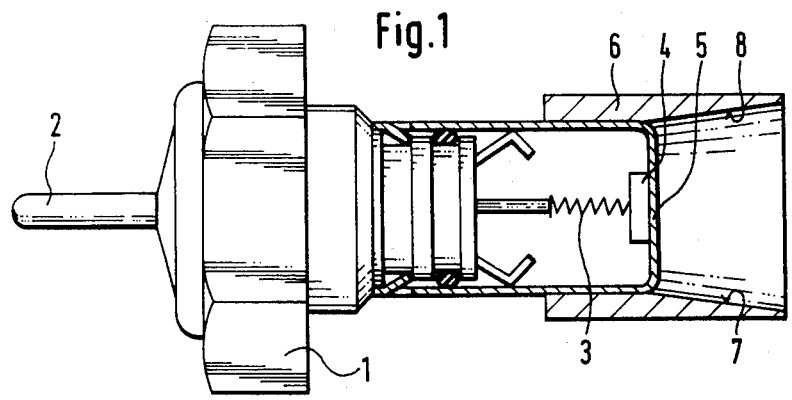
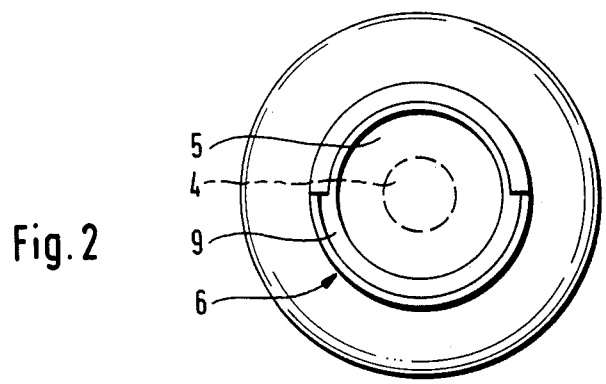
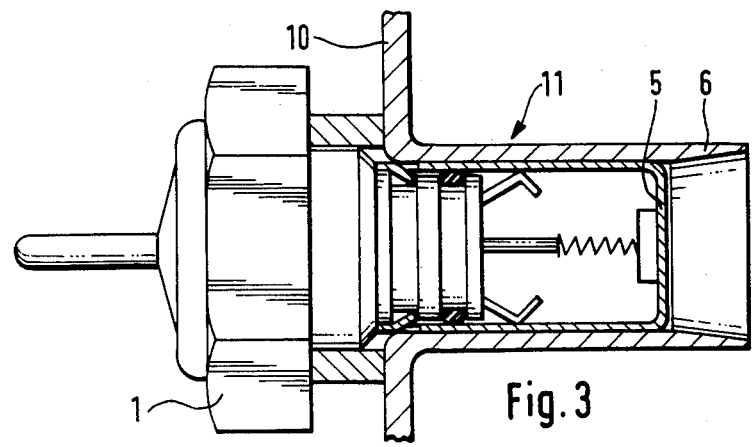

DEVICE FOR DETERMINING THE FLUID LEVEL IN A CONTAINER AND CONTAINER HAVING SUCH A DEVICE

FIELD AND BACKGROUND OF THE INVENTION

The present invention refers to a device for determining the extent to which a container is full, in particular with a liquid, the device having a membrane with one side facing the fluid to be measured. On the other side of the membrane is an electromechanical transducer which induces vibrations in the membrane. The invention furthermore concerns a container configured for such a device.

Such devices are employed, as a rule, in automobile tanks in order to be able to produce a warning signal when a minimum fluid level is reached. The action of these devices is based on the fact that the vibrations of the membrane are damped by the liquid which acts on it. The different vibratory behavior in the presence and absence of liquid is detected in an evaluation device so that the desired warning signal can be produced.

In automobile gasoline tanks as well as in other containers, a problem arises in that upon the introduction of liquid, particularly upon the initial filling, a relatively large amount of air and gas passes into the liquid. Gas or air bubbles can then attach themselves to the side of the membrane facing the liquid, with the result that the membrane can vibrate more easily than if it were completely covered by the liquid. A false warning is then easily the result.

SUMMARY OF THE INVENTION

The object of the invention is to create a device of the aforementioned type in which the danger of a false warning as a result of the attachment of air or gas bubbles to the membrane is avoided. Furthermore, a container which has such a device is to be created.

The first-mentioned object is achieved in accordance with the invention in the manner that the membrane is disposed within a protective tube which extends beyond the membrane towards the measurement fluid.

By this development in accordance with the invention, air and gas bubbles which rise in the fluid being measured no longer reach the membrane. As a result, the attachment of gas and air bubbles to the membrane, and thus a false warning by the device as a result thereof, are excluded. The protective tube is of scarcely any importance from the standpoint of cost, so that this advantage can be obtained without any substantial additional expense as compared with traditional devices.

In order to make certain that, after the liquid has dropped below the level of the device, no liquid remains in the protective tube and thereby simulates a higher level of filling, it is advantageous for the protective tube to have on its inside a run-off bevel which extends with a slope towards its outer end.

The running of liquid out of the protective tube can be obtained particularly simply if, in accordance with one advantageous embodiment of the invention, the protective tube has on its inside a conical widening which widens in the direction away from the membrane. This widening furthermore affords the advantage that gas or air bubbles produced in the protective tube can move out from it.

It is also advantageous for the protective tube to have at least one opening at its uppermost point in its installed position. Gas bubbles which are produced from the liquid within the protective tube, for instance as a result of a strong increase in temperature, can escape upward through these openings so that they do not attach themselves to the membrane.

Effective protection from gas or air bubbles rising from the bottom and at the same time a possibility of the unimpeded rising of gas and air bubbles which form directly in front of the membrane are obtained if the protective tube is a half-shell which is open towards the top and towards the front.

The second-mentioned object, namely the creation of a container having a device of the aforementioned type, is achieved in the manner that, in order to receive the device, the wall of the container has an inward-directed length of tube which, when the device is installed extends beyond the membrane of the device and thereby forms a protective tube for the membrane. Such a container can be manufactured at very low cost since the length of tube forms both a receiver for the device and the protective tube for the prevention of the attachment of gas and air bubbles.

BRIEF DESCRIPTION OF THE DRAWINGS

The invention permits of numerous embodiments. Three of them are shown in the drawing and will be described below.

In the drawing:

FIG. 1 is a partial longitudinal section through the device of the invention;

FIG. 2 is a front view of a second embodiment of the device of the invention; and FIG. 3 show a region of a container pertaining to the invention and having the device according to the invention, seen in section.

DETAILED DESCRIPTION OF THE PREFERRED EMBODIMENTS

The device shown in FIG. 1 has a mount 1 by which the device can be fastened to a wall (not shown) of a liquid container. On the mount 1 there is provided an electric terminal 2 which extends towards the outside of the liquid container, and is connected by a flexible electric line 3 to an electromechanical transducer 4, which is ordinarily a piezoelectric element. In installed condition, the part of the device directed towards the electromechanical transducer 4 extends into the liquid container. The transducer 4 is fastened on the inner side of a membrane 5, the outer side of which faces the liquid.

Important for the invention is a protective tube 6 which, comparable to a photographic lens hood, extends beyond the membrane into the liquid container. This protective tube 6 is provided on its bottom with a run-off bevel 7 which slopes downward in forward direction so that no liquid can collect in the protective tube 6. The run-off bevel 7 can, however, be formed by a single groove, in the manner that the protective tube 6 is provided on its inner side with a conical widening 8, as shown in FIG. 1.

The embodiment shown in FIG. 2 differs from the one described above by the fact that the protective tube 6 is developed as a half-shell 9, at least in the region lying in front of the membrane 5. This half-shell is open towards the front and the top. In this way, no air or gas bubbles can reach the membrane 5 from below.

Not shown in the drawing an embodiment in which the protective tube 6, while being substantially closed at top, nevertheless has at its highest point at least one opening so that gas and air bubbles can escape from the protective tube 6.

FIG. 3 shows a partial region of a wall 10 of a container, the wall being developed integral with an inward-directed length of tube 11. This length of tube 11 receives the device of the invention. It is longer than the device so as to be able to extend into the container so that the membrane 5 of the device is within the length of tube 11. In this way, the part of the length of tube 11 inside the container forms the protective tube 6 which has been explained in the preceding embodiments.

We claim:

1. A device for detecting a filling level of fluid in a container, comprising
   a membrane;
   means for holding said membrane within said container with one side of said membrane facing the fluid to be measured;
   an electromechanical transducer disposed within said holding means contiguous the side of the membrane opposite said one side for placing the membrane in vibration, which vibration is damped by contact of the membrane with the fluid; and wherein
   said holding means includes a protective tube encircling said membrane and extending beyond the membrane towards the fluid to be measured.

2. The device according to claim 1, wherein the protective tube has on its inner side a run-off bevel which extends with a slope to an outer end of said tube.

3. The device according to claim 2, wherein
   said protective tube is provided on its inner side with a conical widening which widens in a direction away from said membrane.

4. The device according to claim 1 wherein,
   said protective tube has at least one opening at its uppermost point in its installed position.

5. The device according to claim 1 wherein
   the protective tube is formed as a half-shell which, in its installed position, is open at the top and towards the front of said device.

6. A unitary construction of a container and fluid-level measuring device for a fluid contained in the container, wherein the container comprises
   a side wall and a tube extending from said side wall inwardly of the container; and wherein said device is supported within an extension of said tube and comprises
   a membrane with one side facing the fluid to be measured; and
   an electromechanical transducer disposed on the opposite side of the membrane for placing the membrane in vibration, which vibration is damped by contact of the membrane with the fluid; and wherein
   said tube extends beyond the membrane of the device, thereby forming a protective tube for the membrane.

7. A construction according to claim 6, wherein
   said transducer is a piezoelectric element in contact with said membrane.

8. A device for detecting a filling level of fluid in a container, comprising:
   a membrane with one side facing the fluid to be measured;
   an electromechanical transducer disposed on the opposite side of the membrane for placing the membrane in vibration;
   the plane of said membrane is disposed in vertical direction; and
   a protective tube in which said membrane is disposed extends beyond the membrane towards the fluid to be measured.

* * * * *